United States Patent
Hayashi

(10) Patent No.: US 12,032,864 B2
(45) Date of Patent: Jul. 9, 2024

(54) PRINTER AND NON-TRANSITORY COMPUTER-READABLE RECORDING MEDIUM STORING COMPUTER-READABLE INSTRUCTIONS FOR PRINTER

(71) Applicant: BROTHER KOGYO KABUSHIKI KAISHA, Nagoya (JP)

(72) Inventor: Hiroyuki Hayashi, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 18/146,649

(22) Filed: Dec. 27, 2022

(65) Prior Publication Data

US 2023/0205472 A1  Jun. 29, 2023

(30) Foreign Application Priority Data

Dec. 28, 2021  (JP) .................. 2021-214995

(51) Int. Cl.
*G06F 3/12* (2006.01)

(52) U.S. Cl.
CPC .......... *G06F 3/1264* (2013.01); *G06F 3/1208* (2013.01); *G06F 3/1256* (2013.01); *G06F 3/1204* (2013.01)

(58) Field of Classification Search
None
See application file for complete search history.

(56) References Cited

U.S. PATENT DOCUMENTS

| | | | |
|---|---|---|---|
| 2009/0230607 A1* | 9/2009 | Masui | G03G 15/6508 271/8.1 |
| 2012/0307276 A1* | 12/2012 | Takenaka | G06K 15/00 358/1.13 |
| 2021/0178785 A1 | 6/2021 | Miura | |
| 2021/0300084 A1* | 9/2021 | Takahashi | B65H 35/0086 |

FOREIGN PATENT DOCUMENTS

JP  2021-094784 A  6/2021

* cited by examiner

*Primary Examiner* — Darryl V Dottin
(74) *Attorney, Agent, or Firm* — Scully, Scott, Murphy & Presser, PC

(57) ABSTRACT

A printer may include: a process executing unit configured to execute a predetermined process related to cutting of a sheet paper; and a controller. The controller may be configured to: after a print executing command has been received, cause a display unit to display an inquiry screen, the inquiry screen being for inquiring a user whether the predetermined process is to be executed on the sheet paper; and in a case where it is selected by a user that the predetermined process is to be executed on the sheet paper, cause the process executing unit to execute the predetermined process on the sheet paper, wherein in a case where it is selected by the user that the predetermined process is not to be executed on the sheet paper, the predetermined process is not executed on the sheet paper.

15 Claims, 6 Drawing Sheets

FIG. 5

(Second Embodiment)

PC —100         Printer —10

Figure 3:
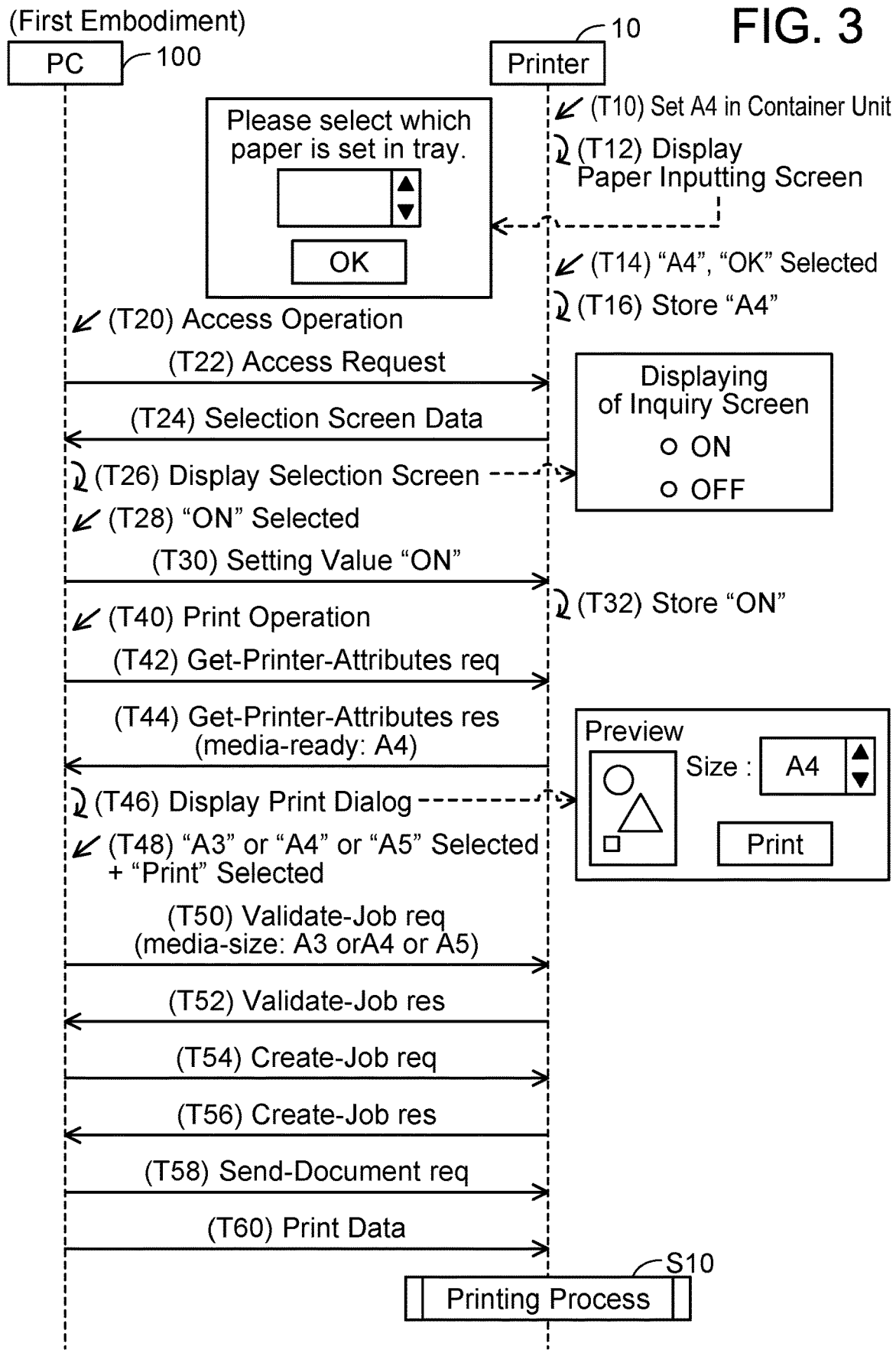

(Same as T10 to T22 of FIG. 3)

(T124) Paper Size Setting Screen Data (T126) Display Paper Size Setting Screen

Displaying of Inquiry Screen
· Containing A4
  – Selection A4
    ○ ON
    ○ OFF
· Containing A4
  – Selection A5
    ○ ON
    ○ OFF
    ⋮
  OK (T128) Containing A4 – Selection A4: OFF, Containing A4 – Selection A5: ON, "OK" Selected (T130) Setting Values (T132) Update Display Table 38

(T40) Print Operation (T42) Get-Printer-Attributes req (T44) Get-Printer-Attributes res (media-ready: A4)

(T46) Display Print Dialog (T48) "A3" or "A4" or "A5" Selected + "Print" Selected (T50) Validate-Job req (media-size: A3 or A4 or A5)

(T52) Validate-Job res (T54) Create-Job req (T56) Create-Job res (T58) Send-Document req (T60) Print Data Printing Process —S10

FIG. 6

(Third Embodiment)

PC —100     Printer —10

(Same as T10 to T22 of FIG. 3)

(T224) User Setting Screen Data ←

(T226) Display User Setting Screen

Displaying of Inquiry Screen
- User U1
- User U2
- Public

[ OK ]

↓ User U1 Selected (T228)
- User U1 Selected +
  Containing A4 – Selection A4: OFF,
  Containing A4 – Selection A5: ON,
- User U2 Selected +
  Containing A4 – Selection A4: OFF,
  Containing A4 – Selection A5: OFF,
- Public Selected +
  Containing A4 – Selection A4: ON,
  Containing A4 – Selection A5: ON,
+ "OK" Selected

Displaying of Inquiry Screen
- User U1
  - Containing A4
    – Selection A4
    ○ ON
    ○ OFF
  - Containing A4
    – Selection A5
    ○ ON
    ○ OFF
    ⋮
- User U2
- Public

[ OK ]

(T230) Setting Values →

(T232) Update Display Table 40

(Same as T40 to T50 of FIG. 3)

(T252) Authorization Required ←

(T254) Display Authentication Screen

User ID : [ ]
Password : [ ]
[ Cancel ] [ OK ]

(T256) User ID "U1",
Password "P1", "OK" Selected (T258) Validate-Job req
(media-size = A3 or A4 or A5, U1, P1) →

(Same as T52 to T60 of FIG. 3)

—S10 Printing Process

PRINTER AND NON-TRANSITORY COMPUTER-READABLE RECORDING MEDIUM STORING COMPUTER-READABLE INSTRUCTIONS FOR PRINTER

REFERENCE TO RELATED APPLICATIONS

This application claims priority from Japanese Patent Application No. 2021-214995 filed on Dec. 28, 2021. The entire content of the priority application is incorporated herein by reference.

BACKGROUND ART

A printing device configured to cut a sheet paper is known.

DESCRIPTION

The present teachings disclose a printer configured to switch whether a predetermined process related to cutting a sheet paper is to be executed or not.

A printer disclosed herein may comprise: a container unit configured to contain a sheet paper; a transportation unit configured to transport the sheet paper from the container unit; a print executing unit configured to execute printing on the sheet paper; a process executing unit configured to execute a predetermined process related to cutting the sheet paper; and a controller. The controller may be configured to: in a case where a print operation for causing the printer to execute printing an image is performed on a terminal device, receive a print executing command from the terminal device; after the print executing command has been received from the terminal device, cause the transportation unit to transport the sheet paper and cause the print executing unit to print the image on the sheet paper; after the print executing command has been received from the terminal device, cause a display unit to display an inquiry screen, the inquiry screen being for inquiring a user whether the predetermined process is to be executed on the sheet paper; and in a case where it is selected by the user in the inquiry screen that the predetermined process is to be executed on the sheet paper, cause the process executing unit to execute the predetermined process on the sheet paper, wherein in a case where it is selected by the user in the inquiry screen that the predetermined process is not to be executed on the sheet paper, the predetermined process is not executed on the sheet paper.

According to the above configuration, the printer displays the inquiry screen for inquiring the user whether the predetermined process to the sheet paper is to be executed or not after the print executing command has been received from the terminal device. The printer executes the predetermined process on the sheet paper when it is selected in the inquiry screen that the predetermined process on the sheet paper is to be executed, while the predetermined process to the sheet paper is not executed when it is selected in the inquiry screen that the predetermined process on the sheet paper is not to be executed. Due to this, the printer is able to switch whether the predetermined process on the sheet paper is to be executed or not.

A control method for realizing the printer, computer-readable instructions for the printer, and a non-transitory computer-readable recording medium storing the computer-readable instructions for the printer are also novel and useful. Further, a communication system comprising the printer and a terminal device is also novel and useful.

Figure 1:
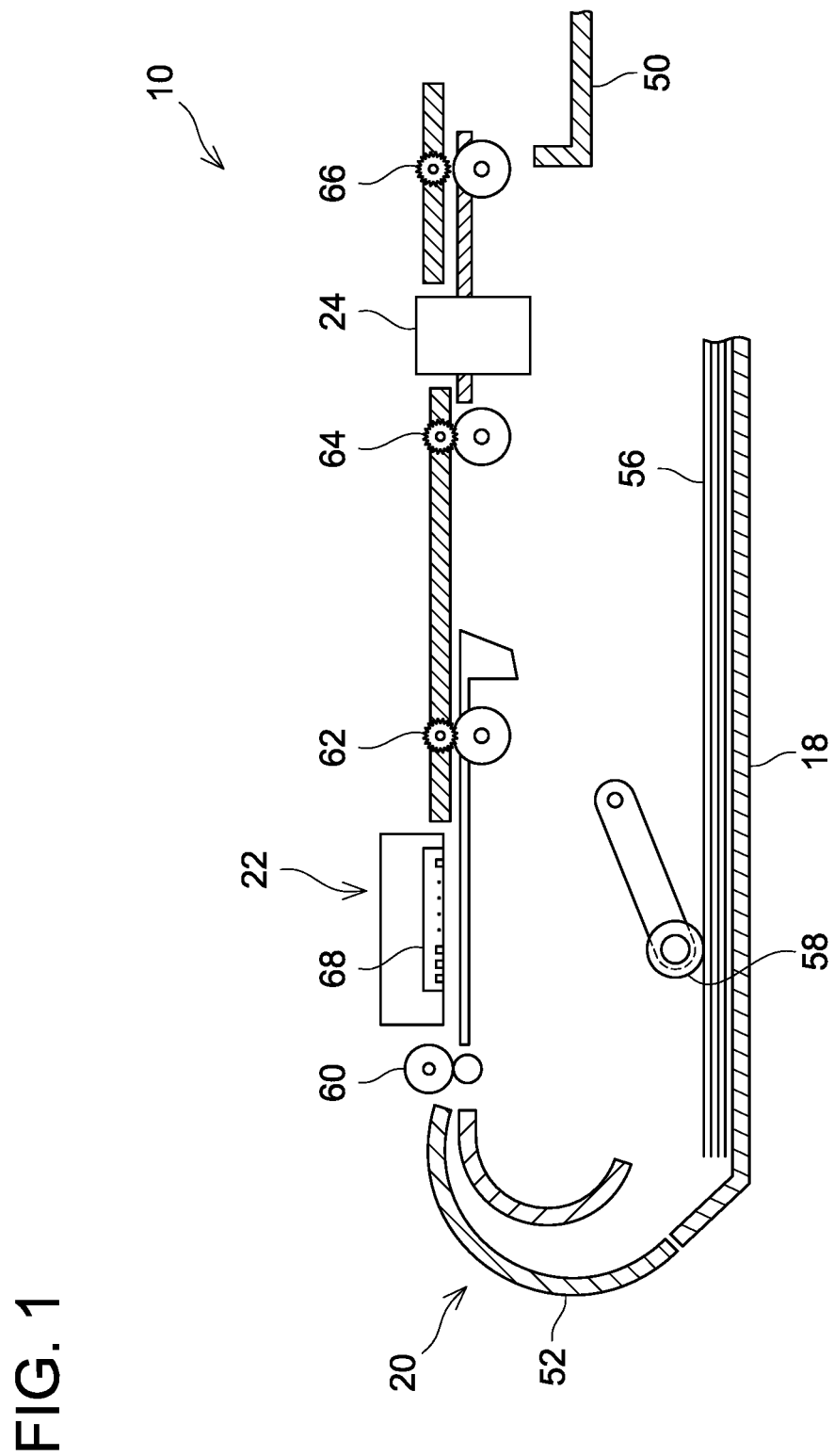
Figure 2:
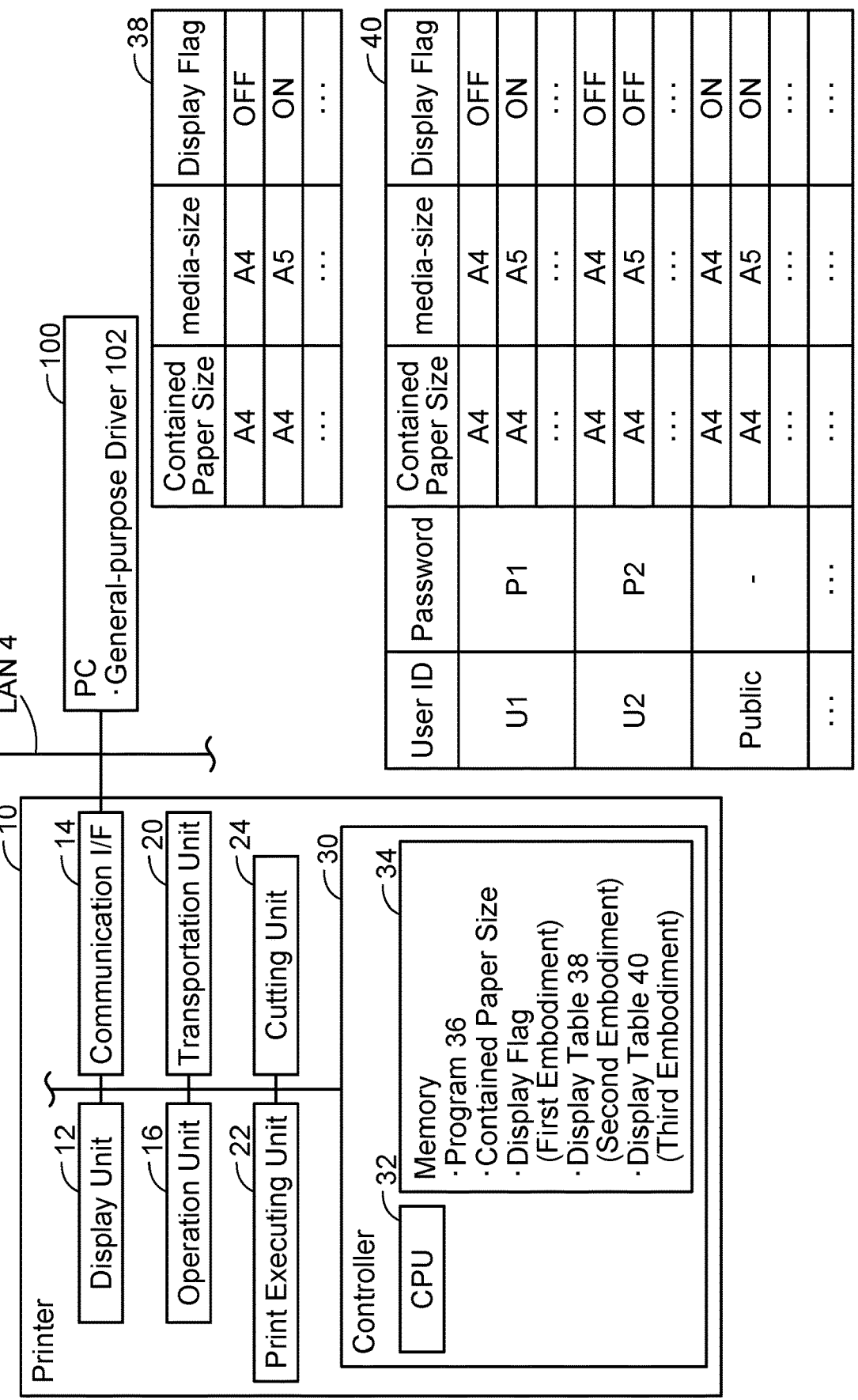
Figure 4:
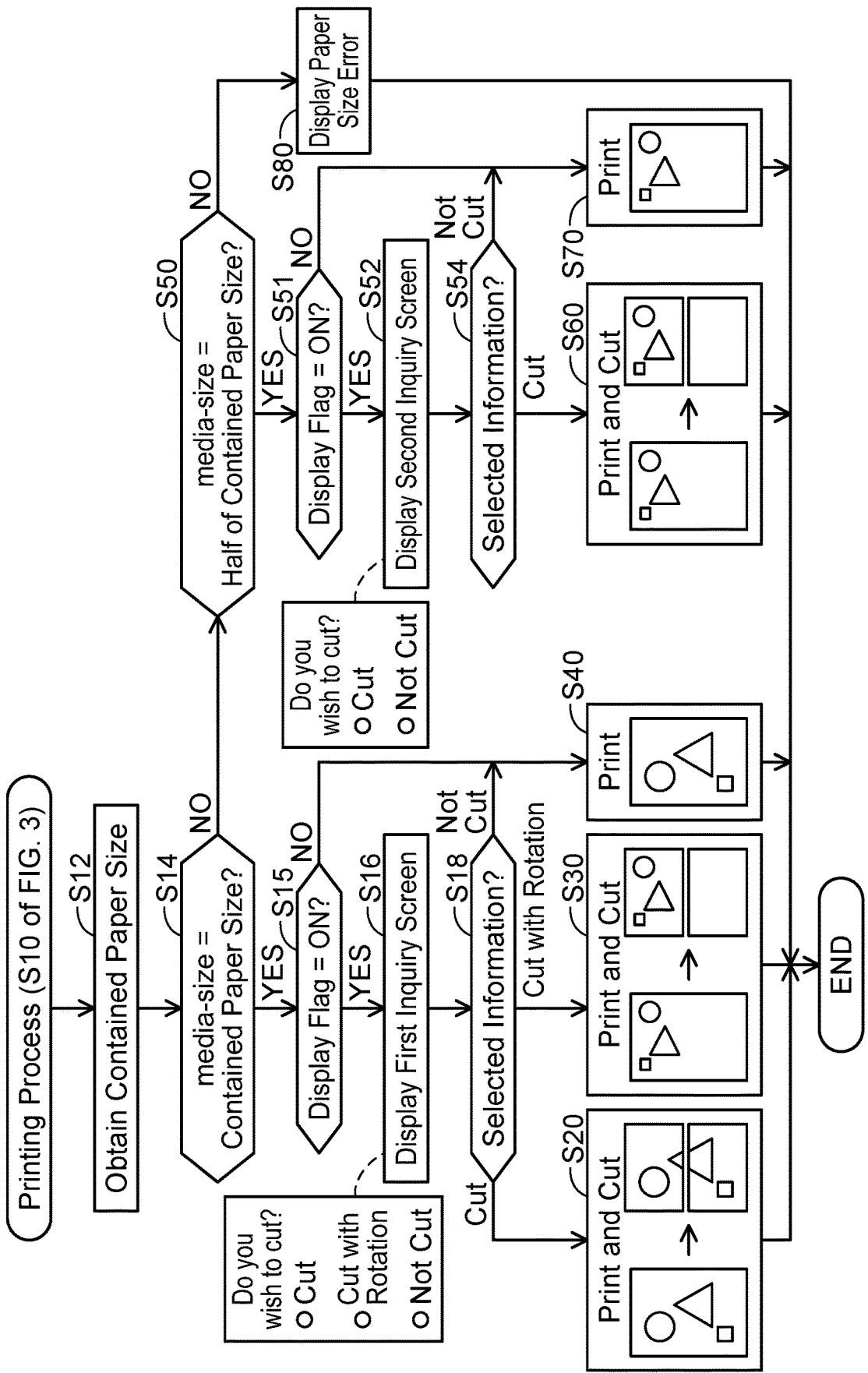

FIG. 1 illustrates a hardware configuration of a printer.
FIG. 2 illustrates a control configuration of the printer.
FIG. 3 illustrates a sequence diagram of a first embodiment.
FIG. 4 illustrates a flow chart of a printing process.
FIG. 5 illustrates a sequence diagram of a second embodiment.
FIG. 6 illustrates a sequence diagram of a third embodiment.

First Embodiment (Hardware Configuration of Printer 10; FIG. 1)

As shown in FIG. 1, a printer 10 comprises a container unit 18, a transport unit 20, a print executing unit 22, a cutting unit 24, and an output tray 50. The container unit 18, the transport unit 20, the print executing unit 22, and the cutting unit 24 are arranged inside a housing (not shown) of the printer 10. The output tray 50 is exposed outside the housing.

The container unit 18 contains sheet papers 56. A "sheet paper" is a paper that is precut in a predetermined size such as A4, A5, letter, and Hagaki (postcard). In the present embodiment, the sheet papers of A4 size are contained in the container unit 18.

The transport unit 20 comprises a transport path 52 and a plurality of rollers 58, 60, 62, 64, 66. Each sheet paper 56 contained in the container unit 18 is transported along the transport path 52 by the rollers 58, etc.

The print executing unit 22 includes an inkjet head 68 in the present embodiment. The inkjet head 68 prints an image on the sheet paper 56 by ejecting ink on the sheet paper 56 transported by the rollers 58, 60. The sheet paper 56 on which printing was executed is further transported downstream in a transport direction by the rollers 62, 64. In a modification, the print executing unit 22 may comprise a printing mechanism of laser method.

The cutting unit 24 includes a cutting blade (not shown). The cutting unit 24 is configured to cut the sheet paper 56 on which printing was executed by the cutting blade moving in a direction perpendicular to sheet surface of FIG. 1. Due to this, the sheet paper 56 is divided into a part upstream and a part downstream in the transport direction. In particular, the cutting unit 24 cuts the sheet paper 56 along a straight line connecting respective middle points of a pair of long sides of the sheet paper 56, by which the sheet paper 56 is cut in half. That is, the cutting unit 24 is able to form two A5-sized sheets as cut by cutting a sheet paper of A4 size in half, for example. The respective sheets of sheet paper 56 as cut are further transported downstream in the transport direction by the roller 66. Due to this, the respective sheets of sheet paper 56 as cut reach the output tray 50.

Thus, the printer 10 according to the present embodiment is configured to cut the sheet paper 56. Due to this, as long as a user of the printer 10 prepares a sheet paper of A4 size, the user is able to obtain a printed paper having a size smaller than A4 size (e.g., A5 size). For example, even when the user wishes to execute a print on a sheet paper of A5 size although the user does not have any sheet paper of A5 size, the printer 10 is able to provide the sheet paper of A5 size to the user by executing printing on a sheet paper of A4 size and cutting the sheet paper of A4 size.

(Control Configuration of Printer 10; FIG. 2)

Next, a control configuration of the printer 10 will be described with reference to FIG. 2. A communication system 2 is realized by the printer 10 and a PC 100. The printer 10 and the PC 100 are connected to a local area network (LAN) 4. The printer 10 and the PC 100 are configured to communicate with each other via the LAN 4. The LAN 4 may be a wired LAN, or may be a wireless LAN.

The printer 10 comprises a display unit 12, a communication interface 14, an operation unit 16, the transport unit 20, the print executing unit 22, the cutting unit 24, and a controller 30. Each unit 12 to 30 is connected to a bus line (reference sign omitted).

The display unit 12 is a display configured to display various types of information. The display unit 12 functions as a so-called touch screen. That is, the display unit 12 functions as an operation unit configured to be operated by a user. The communication interface 14 is connected to the LAN 4. The operation unit 16 comprises a plurality of keys. The user is able to input various instructions to the printer 10 by operating the operation unit 16. The rollers 58, etc. of the transport unit 20, the print executing unit 22, and the cutting unit 24 transport the sheet paper 56, print on the sheet paper 56, and cut the sheet paper 56 in accordance with instructions from the controller 30 (that is, a CPU 32 to be described later).

The controller 30 comprises the CPU 32 and a memory 34. The CPU 32 is configured to execute various processes in accordance with a program 36 stored in the memory 34. The memory 34 may be composed of a volatile memory, a non-volatile memory, and/or the like, for example. The memory 34 stores a contained paper size and a display flag besides the above program 36. The contained paper size indicates a size of a sheet paper being contained in the container unit 18. The display flag indicates one of "ON" indicating that an inquiry screen to be described later is to be displayed and "OFF" indicating that the inquiry screen is not to be displayed.

(Configuration of PC 100)

The PC 100 is used by the user of the printer 10. The PC 100 comprises a general-purpose driver 102. The general-purpose driver 102 is a printer driver provided by an entity different from a vendor of the printer 10. The general-purpose driver 102 is different from a printer driver dedicated (that is, dedicated driver) to a given printer, and is configured to cause various types of printers manufactured by plural printer vendors to execute printing. The general-purpose driver 102 may be installed in the PC 100 from a server on the internet (not shown), or may be installed in the PC 100 in advance prior to the shipment of the PC 100. In the present embodiment, the general-purpose driver 102 is a printer driver configured to execute processes in accordance with Internet Printing Protocol (IPP). In a modification, the general-purpose driver 102 may be a printer driver configured to execute processes in accordance with a scheme different from the IPP scheme.

(Specific Case; FIG. 3)

Subsequently, a specific case will be described with reference to FIG. 3. All communications performed by the printer 10 are executed via the communication interface 14. Due to this, when various types of communication performed by the printer 10 are described, a recitation "via the communication interface 14" will be omitted.

The user sets the sheet paper 56 of A4 size in the container unit 18 of the printer 10 in T10 of FIG. 3.

When the printer 10 (i.e., CPU 32) accepts the sheet paper 56 set in T10, the printer 10 displays a paper inputting screen on the display unit 12 in T12. The paper inputting screen includes a message for inquiring the user about the size of the sheet paper set in the container unit 18 (i.e., paper feeding tray), a box for selecting the contained paper size, and an OK button. The printer 10 accepts selection of the contained paper size "A4" and selection of the "OK" button from the user in T14. In this case, the printer 10 stores the contained paper size "A4" in the memory 34 in T16. In a modification, the printer 10 may comprise a sensor configured to detect the contained paper size. In this case, the user does not need to select which size the contained paper size is.

The PC 100 accepts an access operation comprising an input of an IP address of a web server in the printer 10 from the user in T20. In this case, the PC 100 sends an access request including the IP address as a destination address to the printer 10 in T22.

When the printer 10 receives the access request from the PC 100 in T22, the printer 10 is able to function as a web server and send various pieces of screen data representing web pages to the PC 100. In the present embodiment, the printer 10 sends selection screen data representing a selection screen for the user to select whether the inquiry screen is to be displayed or not to the PC 100 in T24.

The PC 10 receives the selection screen data from the printer 10 in T24, and displays the selection screen in T26. The selection screen is a screen for selecting either "ON" indicating that the inquiry screen is to be displayed or "OFF" indicating that the inquiry screen is not to be displayed. The user selects "ON" included in the selection screen in T28. In this case, the PC 100 sends a setting value "ON" to the printer 10 in T30. Thus, the user is able to access the web server of the printer 10 and perform setting change on whether the inquiry screen is to be displayed or not.

When the printer 10 has received the setting value "ON" from the PC 100 in T30, the printer 10 stores the display flag "ON" in the memory 34 in T32. Thus, the printer 10 is able to store the display flag in the memory 34 in advance before executing printing.

Thereafter, the user performs a print operation on the PC 100 in T40. The print operation comprises an operation of selecting image data representing an image to be printed and an operation of activating the general-purpose driver 102. Due to this, respective following processes are executed by the general-purpose driver 102. When the PC 100 has accepted the print operation from the user in T40, the PC 100 sends Get-Printer-Attributes request according to the IPP scheme to the printer 10 in T42. Hereafter, Get-Printer-Attributes will be referred to as "GPA", and request will be referred to as "req". The GPA req is a command for requesting sending of Capability information of the printer 10.

When the printer 10 receives the GPA req from the PC 100 in T42, the printer 10 specifies the contained paper size "A4" stored in the memory 34 and sends GPA response including the specified contained paper size "A4" as media-ready to the PC 100 in T44. Hereafter, response will be referred to as "res". In a modification, the specified contained paper size "A4" may be sent as media-col-ready. Further, the GPA res includes "A3", "A4", and "A5" as information indicating paper sizes which the printer 10 supports (that is, paper sizes that can be contained in the container unit 18).

When the PC 100 receives the GPA res from the printer 10 in T44, the PC 100 displays a print dialog in T46. The print dialog includes a preview image indicating the image to be printed, a size selection box for selecting the size of sheet paper to be printed, and a Print button. In the size selection box, the paper size "A4" included in the GPA res is displayed as a default paper size. The PC 100 accepts an operation of selecting one of "A3", "A4", and "A5" and an operation of selecting the Print button in T48. In this case, the PC 100 sends Validate-Job req according to the IPP scheme to the printer 10 in T50. The Validate-Job req includes a media-size indicating the paper size designated by the user in the print dialog (that is, "A3", "A4", or "A5" in the present case).

When the printer 10 receives the Validate-Job req in T50, the printer 10 sends Validate-Job res to the PC 100 in T52. As a result of this, the printer 10 receives Create-Job req from the PC 100 in T54. The Create-Job req is a command for requesting the printer 10 to generate a print job. Then, the printer 10 sends Create-Job res to the PC 100 in T56.

When the PC 100 receives the Create-Job res from the printer 10 in T56, the PC 100 converts the image data to be printed and generates print data having a data format which can be interpreted by the printer 10. The image represented by the print data has a size corresponding to the media-size included in the Validate-Job req (that is, "A3", "A4", or "A5"). Then the PC 100 sends Send-Document req to the printer 10 in T58, and sends the print data to the printer 10 in T60.

The printer 10 receives the Send-Document req from the PC 100 in T58, and receives the print data from the PC 100 in T60. In this case, the printer 10 executes a printing process in S10. The printing process will be described later with reference to FIG. 4.

(Printing Process; FIG. 4)

Subsequently, with reference to FIG. 4, the printing process of S10 in FIG. 3 executed by the CPU 32 of the printer 10 will be described. The printing process is started with the print data being received from the PC 100 as a trigger of the process.

In S12, the CPU 32 obtains the contained paper size (see T16 of FIG. 3) stored in the memory 34.

In S14, the CPU 32 determines whether the media-size included in the received Validate-Job req (see T50 of FIG. 3) is the same as the contained paper size obtained in S12. In a case where the former size and the latter size are the same, the CPU 32 determines YES in S14 and proceeds to S15, while in a case where the former size and the latter size are different, the CPU 32 determines NO in S14 and proceeds to S50.

In S15, the CPU 32 determines whether the display flag stored in the memory 34 (see T32 of FIG. 3) indicates ON or OFF. In a case where the display flag indicates ON, the CPU 32 determines YES in S15 and proceeds to S16. Contrary to this, in a case where the CPU 32 indicates OFF, the CPU 32 determines NO in S15 and proceeds to S40.

In S16, the CPU 32 causes the display unit 12 to display a first inquiry screen. the first inquiry screen includes a message which inquires of the user whether to cut the sheet paper and three choices: "Cut", "Cut with Rotation" and "Not Cut". The choice "Cut" is a choice for printing the image represented by the received print data (that is, image having a size coinciding with the contained paper size) without any positional changes, and cutting the printed paper in half. The choice "Cut with Rotation" is a choice for reducing the size of the image represented by the received print data to a half size, rotating the reduced image by 90 degrees, printing the image, and cutting the printed paper in half. The choice "Not Cut" is a choice for printing the image represented by the received print data without any positional changes and not cutting the printed paper.

In S18, the CPU 32 determines which one of the choices was selected in the first inquiry screen. In a case where the choice "Cut" is selected in the first inquiry screen, the CPU 32 proceeds to S20; in a case where the choice "Cut with Rotation" is selected in the first inquiry screen, the CPU 32 proceeds to S30; and in a case where the choice "Not Cut" is selected in the first inquiry screen, the CPU 32 proceeds to S40.

In S20, the CPU 32 executes printing and cutting as will be described below. Firstly, the CPU 32 transports the sheet paper 56 contained in the container unit 18 to the print executing unit 22. Because the size of the image represented by the print data coincides with the contained paper size (YES in S14) and the choice "Cut" has been selected in the first inquiry screen ("Cut" in S18), the CPU 32 instructs the print executing unit 22 to print the image over a substantially entirety of the sheet paper 56. Due to this, the print executing unit 22 prints the image substantially on the entirety of the sheet paper 56. In the present embodiment, the image includes three objects indicating a circle, a triangle, and a square.

Subsequently, the CPU 32 activates the respective rollers 60, 62, 64 of the transport unit 20 to transport the printed sheet paper 56 to the cutting unit 24. Then, the CPU 32 instructs the cutting unit 24 to cut the printed sheet paper 56. Due to this, the cutting unit 24 cuts the sheet paper 56 at a boundary between a downstream half region (that is, a half region downstream in the transport direction) and an upstream half region (that is, a half region upstream in the transport direction). That is, the cutting unit 24 cuts the sheet paper 56 along a straight line connecting respective middle points of a pair of long sides of the sheet paper 56, by which the sheet paper 56 is cut in half. As a result of this, a sheet paper as cut on which a part of the image (that is, the circle and a part of the triangle) is printed and a sheet paper as cut on which the remaining part of the image (that is, the remaining part of the triangle and the square) is printed are formed.

Subsequently, the CPU 32 activates the respective rollers 64, 66 of the transport unit 20 to transport the two sheet papers as cut to the output tray 50. Due to this, the two sheet papers as cut are supplied to the user. When the process of S20 is completed, the processes of FIG. 4 are completed.

In S30, the CPU 32 executes printing and cutting as will be described below. Firstly, the CPU 32 transports the sheet paper 56 contained in the container unit 18 to the print executing unit 22. Because the size of the image represented by the print data coincides with the contained paper size (YES in S14) and the choice "Cut with Rotation" has been selected in the first inquiry screen ("Cut with Rotation" in S18), the CPU 32 reduces the size of the image to the half size to generate a reduced image. Further, the CPU 32 rotates the reduced image by 90 degrees to generate a rotated image, and instructs the print executing unit 22 to print the rotated image in the downstream half region of the sheet paper 56. Due to this, the print executing unit 22 prints the rotated image in the downstream half region of the sheet paper 56. That is, nothing is printed on the upstream half region of the sheet paper 56.

Subsequently, the CPU 32 activates the rollers 60, 62, 64 of the transport unit 20 to transport the printed sheet paper 56 to the cutting unit 24. Then, the CPU 32 instructs the cutting unit 24 to cut the printed sheet paper 56. The cutting at this occasion is the same as the cutting of S20. As a result of this, a sheet paper as cut on which the rotated image is printed and a sheet paper as cut on which no image is printed are formed.

Subsequently, the CPU 32 activates the respective rollers 64 and 66 of the transport unit 20 to transport the two sheet papers as cut to the output tray 50. Due to this, the two sheet papers as cut are supplied to the user. When the process of S30 is completed, the processes of FIG. 4 are completed.

In S40, the CPU 32 executes printing as below. The CPU 32 causes the print executing unit 22 to print the image represented by the print data. Specific process for printing the image is the same as S20. Next, the CPU 32 activates the respective rollers 60, 62, 64, 66 of the transport unit 20 to transport the printed sheet paper 56 to the output tray 50. The CPU 32 does not instruct the cutting unit 24 to cut the printed sheet paper 56. As a result of this, one printed paper is formed. When the process of S40 is completed, the processes of FIG. 4 are completed.

In S50, the CPU 32 determines whether the media-size included in the received Validate-Job req (see T50 of FIG. 3) is half the size of the contained paper size obtained in S12. In a case where the former size is half the latter size, the CPU 32 determines YES in S50 and proceeds to S51, whereas in a case where the former size is not half the latter size, the CPU 32 determines NO in S50 and proceeds to S80. The process of S51 is the same as the process of S15.

In S52, the CPU 32 causes the display unit 12 to display a second inquiry screen. The second inquiry screen is the same as the first inquiry screen (see S16) except that the second inquiry screen does not include the choice "Cut with Rotation". The process of S54 is the same as the process of S18 except that the choice "Cut with Rotation" does not exist.

In S60, the CPU 32 executes printing and cutting as will be described below. Firstly, the CPU 32 transports the sheet paper 56 contained in the container unit 18 to the print executing unit 22. Because the size of the image represented by the print data is half the contained paper size (YES in S50) and the choice "Cut" has been selected in the second inquiry screen ("Cut" in S54), the CPU 32 instructs the print executing unit 22 to rotate the image by 90 degrees to generate a rotated image and print the rotated image on the downstream half region of the sheet paper 56. Due to this, two sheet papers as cut the same as those of S30 are formed. When the process of S60 is completed, the processes of FIG. 4 are completed.

In S70, the CPU 32 causes the print executing unit 22 to execute printing of the image represented by the print data. Specific process at this occasion for printing is the same as S60. Next, the CPU 32 activates the respective rollers 60, 62, 64, 66 of the transport unit 20 to transport the printed sheet paper 56 to the output tray 50. The CPU 32 does not instruct the cutting unit 24 to cut the printed sheet paper 56. As a result, one printed paper is formed. When the process of S70 is completed, the processes of FIG. 4 are completed.

In S80, the CPU 32 causes the display unit 12 to display paper size error. The paper size error includes a message indicating that the media-size is not the same as the contained paper size (NO in S14) and the media-size is not half the contained paper size (NO in S50) so that printing cannot be executed. When the process of S80 is completed, the processes of FIG. 4 are completed.

Effects of First Embodiment

According to the above configuration, when the printer 10 receives the print data from the PC 100 (T60 in FIG. 3), the printer 10 displays the first or second inquiry screen for inquiring the user whether the sheet paper 56 is to be cut or not (S16 or S52 in FIG. 4). In a case where it is selected in the first or second inquiry screen that the sheet paper 56 is to be cut ("Cut" or "Cut with Rotation" in S18 or S54), the printer 10 executes the cutting of the sheet paper 56 (S20, S30, S60) whereas in a case where it is selected in the first or second inquiry screen that the sheet paper 56 is not to be cut ("Not Cut" in S18 or S54), the sheet paper 56 is not cut (S40, S70). Due to this, the printer 10 is able to switch whether the sheet paper 56 is to be cut or not.

In particular, in the present embodiment, the PC 100 comprises the general-purpose driver 102, not a dedicated driver. If the PC 100 has a dedicated driver for the printer 10 configured to cut sheet papers, the PC 100 is able to allow the user to select in a print setting screen (screen equivalent to the print dialog in T46 of FIG. 3) whether the sheet paper is to be cut or not. However, it is difficult for the general-purpose driver 102 to allow the user to make such selection. Since printers configured to cut sheet papers have not been widely known, it is highly likely that setting items for making such selection are not provided in its print setting screen. Accordingly, the printer 10 does not receive a cutting request command for instructing to cut the sheet paper from the PC 100. The printer 10 according to the present embodiment is able to switch whether to cause the cutting unit 24 to cut the sheet paper 56 according to the user's selection in the first or second inquiry screen (see S18, S20 to S40, S54, S60, S70 in FIG. 4) even when the cutting request command is not received from the PC 100.

Further, in a case where the media-size included in the Validate-Job req is the same as or half the contained paper size (YES in S14 or YES in S50) only, the printer 10 displays the inquiry screen (S16 or S52). For example, if the media-size is A3 and the contained paper size is A4, the printer 10 is not able to execute printing properly since the size of the image represented by the print data is greater than the contained paper size. Also, in a case where the media-size is A5 and the contained paper size is A3 for example, the A5 selected by the user cannot be realized even if the sheet paper 56 is cut in half. In such a situation, the printer 10 does not display the inquiry screen but displays paper size error (S80). As such, the printer 10 does not display the inquiry screen in a situation where printing cannot be performed properly and in a situation where the paper size selected by the user cannot be realized even by cutting the sheet paper. Due to this, a situation that printing is not performed despite a user has conducted a selection operation in the inquiry screen can be suppressed from taking place.

Second Embodiment; FIG. 5

Next, a second embodiment will be described. In the second embodiment, a display table 38 (see FIG. 2) is stored in the memory 34 instead of the display flag of the first embodiment. The display table 38 stores the display flag in association with a combination of the contained paper size and the media-size.

Processes the same as T10 to T22 of FIG. 3 will be executed in the PC 100 and the printer 10. The printer 10 sends paper size setting screen data indicating a paper size setting screen to the PC100 in T124. The paper size setting screen is a screen for allowing the user to designate whether the inquiry screen is to be displayed for each of plural combinations of a paper size that can be contained in the printer 10 (that is, A3, A4, or A5) and a paper size that can be selected by the user (that is, the media-size which may be included in the Validate-Job req (A3, A4, or A5)). Hereafter, the paper size that can be selected by the user will be referred to as "selected paper size".

The PC 100 receives the paper size setting screen data from the printer 10 in T124, and displays the paper size setting screen in T126. In T128, the user selects "Off" for a combination of contained paper size "A4" and selected paper size "A4", selects "On" for a combination of contained paper size "A4" and selected paper size "A5" and then selects the OK button. Although this is not shown, the user makes selections of "On" or "Off" for other combination(s) (e.g., combination of contained paper size "A3" and selected paper size "A4"). In this case, the PC 100 sends respective setting values as selected to the printer 10 in T130. As such, the user is able to select whether the inquiry screen is to be displayed or not for each of the plurality of combinations of contained paper size and selected paper size.

When the setting values have been received from the PC 100 in T130, the printer 10 stores the respective display flags indicated by the respective setting values in the display table 38 in the memory 34 in T132.

Next, processes of T40 to T60 and a process of S10 will be performed in the PC 100 and the printer 10. These processes are the same as those of FIG. 3 and FIG. 4. As a result of this, in the case where the contained paper size is A4 and the media-size is A4 for example, the first inquiry screen is not displayed (YES in S14 and NO in S15 in FIG. 4), for example. Further, in the case where the contained paper size is A4 and the media-size is A5 for example, the second inquiry screen is displayed (YES in S50, and YES in S51, S52 of FIG. 4).

Third Embodiment; FIG. 6

Subsequently, a third embodiment will be described. In the third embodiment, the memory 34 stores a display table 40 (see FIG. 2) which differs from the display table 38 of the second embodiment. The display table 40 stores a user ID, a password, combinations of contained paper size and media-size, and display flags in association with one another. That is, the display table 40 stores, for each of the user(s) of the printer 10, the display flags in association with the combinations of contained paper size and media-size.

In the PC 100 and the printer 10, processes the same as T10 to T22 of FIG. 3 will be performed. The printer 10 sends user setting screen data representing a user setting screen to the PC 100 in T224. The user setting screen is a screen for allowing a user (e.g., administrator of the printer 10) to designate, for each of the user(s) registered in the printer 10, whether the inquiry screen is to be displayed for each of the plural combinations of the paper size which can be contained in the printer 10 (i.e., A3, A4, or A5) and the paper size which can be selected by the user (i.e., media-size which may be included in Validate-Job req (A3, A4, or A5)).

The PC100 receives the user setting screen data from the printer 10 in T224, and displays the user setting screen in T226. In T228, the user selects for the user U1, "Off" for the combination of contained paper size "A4" and selected paper size "A4", and selects "On" for the combination of contained paper size "A4" and selected paper size "A5". Similarly, the user selects for the user U2 "Off" for the combination of contained paper size "A4" and selected paper size "A4", and selects "Off" for the combination of contained paper size "A4" and selected paper size "A5". Further, the user selects for Public, "On" for the combination of contained paper size "A4" and selected paper size "A4", and selects "On" for the combination of contained paper size "A4" and selected paper size "A5". Although not shown, the user selects for each of the users, "On" or "Off" for the respective other combinations (e.g., combination of contained paper size "A3" and selected paper size "A4", etc.). Thereafter, the user selects the OK button. In this case, the PC 100 sends the respective setting values as selected to the printer 10 in T230. Thus, the user (e.g., the administrator of the printer 10) is able to select whether or not the inquiry screen is to be displayed or not for each of the respective combinations of the contained paper size and the selected paper size, for each of the users of the printer 10.

When the printer 10 receives the setting values from the PC 100 in T230, the printer 10 stores the respective display flags indicated by the respective setting values in the display table 40 in the memory 34 in T232.

Subsequently, in the PC 100 and the printer 10, processes the same as T40 to T50 of FIG. 3 will be described. Subsequently, the printer 10 sends Authorization Required (hereafter, will be referred to as "Auth") according to the IPP scheme to the PC 100 in T252. The Auth is a command for requesting sending of user information.

When the PC 100 receives the Auth from the printer 10 in T252, the PC 100 displays an authentication screen in T254. The authentication screen includes a user ID inputting area, a password inputting area, and an OK button. The user inputs a user ID "U1" and a password "P1" and selects the OK button in T256. In this case, the PC 100 sends Validate-Job req including media-size indicating the paper size designated by the user (that is, "A3", "A4", or "A5", see T48 of FIG. 3), the user ID "U1", and the password "P1" to the printer 10 in T258.

Subsequently, processes the same as T52 to T60 of FIG. 3 and the process of S10 will be performed. As a result of this, in the situation where the input of the user ID "U1" and the password "P1" is accepted in T256, the printing process the same as that of the second embodiment (that is, the process of FIG. 4) is performed (because the display table 38 of the second embodiment and the part in the display table 40 associated with the user U1 in the third embodiment are equal to each other). Further, in the situation where the inputting of the user ID "U2" and the password "P2" is accepted in T256, the first or second inquiry screen is not displayed even in the case where the contained paper size is A4 and the media-size is A4, and even in the case where the contained paper size is A4 and the media-size is A5 (YES in S14 of FIG. 4, NO in S15, or YES in S50, NO in S51). Further, in the situation where the inputting of the user ID "Public" is accepted in T256, the first inquiry screen is displayed (YES in S14, YES in S15, S16 in FIG. 4) in the case where the contained paper size is A4 and the media-size is A4, and the second inquiry screen is displayed (YES in S50, YES in S51, S52) in the case where the contained paper size is A4 and the media-size is A5.

(Correspondence Relationship)

The PC 10 is an example of "terminal device" and "external device". The display unit 12 and the cutting unit 24 are an example of "display unit" and "process executing unit". The general-purpose driver 102 is an example of "general-purpose printer driver". The first inquiry screen displayed in S16 of FIG. 4 (and second inquiry screen displayed in S52) is an example of "inquiry screen". The contained paper size and media-size are respectively an example of "first paper size" and "second paper size". The display flag is an example of "setting value". The selection screen, the paper size setting screen, and the user setting screen are examples of "setting screen".

The process of T22 of FIG. 3 is an example of "receive an access request". The processes of T24 of FIG. 3, T124 of FIG. 5, and T224 of FIG. 6 are an example of "send, to the external device, setting screen data". The processes of T30 of FIG. 3, T130 of FIG. 5, and T230 of FIG. 6 are an example of "receive the setting value". The processes of T32 of FIG. 3, T132 of FIG. 5, and T232 of FIG. 6 are an example of "cause, before the print executing command is received from the terminal device, the memory to store a setting value". The processes of T50, T54, and T58 of FIG. 3 are an example of "receive a print executing command". The process of S12 of FIG. 4 is an example of "obtain a first paper size". The processes of S16 and S52 of FIG. 4 are an example of "cause a display unit to display an inquiry screen". The processes of S20, S30, S40, S60, S70 of FIG. 4 are an example of "cause the transportation unit to transport the sheet paper and cause the print executing unit to print the image on the sheet paper". The processes of S20, S30, and S60 of FIG. 4 are an example of "cause the process executing unit to execute the predetermined process". The process of T258 of FIG. 6 is an example of "receive target user information".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(MODIFICATION 1) The time at when the printing process of S10 of FIG. 3 starts is not limited to that in the above embodiments. For example, a situation is assumed in which the printer 10 does not perform printing immediately after the print data has been received from the PC 100, but stores the print data in the memory 34. In this case, the printer 100 starts printing of the image represented by the print data in a case where the printer 100 accepts an instruction for starting printing of the image from the user in the state where the printer 100 has the print data stored in the memory 34. In such a case, in the case where the above instruction is accepted, the printer 10 may perform the printing process of S10. That is, in the case where the above instruction is accepted from the user, the printer 10 may display the inquiry screen. Generally speaking, in "cause a display unit to display an inquiry screen", the time at when the inquiry screen is displayed may be any time after the print executing command is received.

(MODIFICATION 2) The printer 10 may send the inquiry screen data representing the first (or second) inquiry screen to the PC 100 in S16 (or S52) of FIG. 4. As a result of this, in the PC 100, the first (or second) inquiry screen is displayed. In a case where one choice is selected by the user in that screen, the printer 10 may receive selection information indicating the one selected choice from the PC 100. Further, in another MODIFICATION, the printer 10 may send Uniform Resource Locator (URL) representing the location of the first (or second) inquiry screen in the printer 10 functioning as a web server to the PC 100 in S16 (or S52) of FIG. 4. As a result of this, by the URL being used in the PC 100, the first (or the second) inquiry screen is displayed in the PC 100. In these modifications, the display unit of the PC 100 is an example of "display unit".

(MODIFICATION 3) In the above embodiments, the inquiry screen displayed varies according to whether the media-size and the contained paper size are the same or the media-size is half the contained paper size (see S16, S52 of FIG. 4). In this MODIFICATION, the printer 10 may cause the same inquiry screen to be displayed in any of the above cases.

(MODIFICATION 4) The printer 10 may cause the inquiry screen to be displayed in a case where the display flag is ON no matter whatever the media-size and the contained paper size are. In the present MODIFICATION, the processes of S12, S14 of FIG. 4, and S50 of FIG. 4 may be omitted. Generally speaking, "obtain a first paper size" may be omitted. Further, in another MODIFICATION, the printer 10 may not store the display flag(s). In the present MODIFICATION, the processes of S15 and S51 of FIG. 4 may be omitted. Generally speaking, "cause, before the print executing command is received from the terminal device, the memory to store a setting value" may be omitted. Further, in another MODIFICATION, the printer 10 may not store the display flags but may display the inquiry screen no matter whatever the media-size and the contained paper size are. That is, the printer 10 may display the inquiry screen in the case where the print data is received from the PC 100. In the present MODIFICATION, "obtain a first paper size" and "cause, before the print executing command is received from the terminal device, the memory to store a setting value" may be omitted.

(MODIFICATION 5) The printer 10 may display the inquiry screen only in a case where the media-size is half the contained paper size. That is, in the present MODIFICATION, in the case of YES in S14 of FIG. 4, the processes of S15 to S18 may be skipped and then proceeded to S40. In the present MODIFICATION, the media-size being half the contained paper size is an example of "predetermined condition". Further, in another MODIFICATION, the inquiry screen may be displayed in the case where the contained paper size is A4 for example, whereas in the case where the contained paper size is A5 for example, the inquiry screen may not be displayed. In the present MODIFICATION, the contained paper size being A4 is an example of "predetermined condition".

(MODIFICATION 6) The user may set the display flag via the operation unit 16 of the printer 10. In the present MODIFICATION, "receive an access request", "send, to the external device, setting screen data", and "receive the setting value" may be omitted. Further, in another MODIFICATION, the access request may be received from a terminal different from the PC 100. In the present MODIFICATION, this different terminal is an example of the "external device".

(MODIFICATION 7) The printer 10 may comprise a perforating unit configured to perforate a sheet paper instead of the cutting unit 24. With perforations created in the sheet paper, the user can easily cut the sheet paper along the perforations. In another MODIFICATION, the printer 10 may comprise a creasing unit configured to crease the sheet paper instead of the cutting unit 24. With a crease created on the sheet paper, the user can easily cut the sheet paper along the creases. Generally speaking, the "predetermined process" may be any process which is related to cutting of the sheet paper.

(MODIFICATION 8) The printer 10 may not cut the sheet paper in half. For example, in the case where the media-size is A5 and the contained paper size is A3, the printer may cut the sheet paper one-fourth of the original size.

(MODIFICATION 9) The PC 100 may not comprise the general-purpose driver 102. In this case, the PC 100 comprises a dedicated driver instead of the general-purpose driver 102. The dedicated driver is a printer driver dedicated for a certain printer.

(MODIFICATION 10) Although in the above embodiments the cutting of sheet paper is performed after the printing on the sheet paper, in this MODIFICATION, the cutting of the sheet paper may be performed and then the printing of the sheet paper may be performed. Generally speaking, "process executing unit" may be arranged upstream of "print executing unit" in the transport direction.

(MODIFICATION 11) Although in the above embodiments each process in FIG. 3 to FIG. 6 is implemented by a software, but at least one of those processes may be implemented by hardware such as a logic circuit.

What is claimed is:

1. A printer comprising:
a container unit configured to contain a sheet paper;
a transportation unit configured to transport the sheet paper from the container unit;
a print executing unit configured to execute printing on the sheet paper;
a process executing unit configured to execute a predetermined process related to cutting the sheet paper; and
a controller
configured to:
in a case where a print operation for causing the printer to execute printing an image is performed on a terminal device, receive a print executing command from the terminal device;
after the print executing command has been received from the terminal device, cause the transportation unit to transport the sheet paper and cause the print executing unit to print the image on the sheet paper;
after the print executing command has been received from the terminal device, cause a display unit to display an inquiry screen, the inquiry screen being for inquiring a user whether the predetermined process related to cutting the sheet paper is to be executed on the sheet paper; and
in a case where it is selected by the user in the inquiry screen that the predetermined process related to cutting the sheet paper is to be executed on the sheet paper, cause the process executing unit to execute the predetermined process related to cutting the sheet paper on the sheet paper, wherein in a case where it is selected by the user in the inquiry screen that the predetermined process related to cutting the sheet paper is not to be executed on the sheet paper, the predetermined process related to cutting the sheet paper is not executed on the sheet paper.

2. The printer according to claim 1, wherein
the controller is further configured to:
obtain a first paper size which is a paper size of the sheet paper contained in the container unit,
wherein the print executing command includes a second paper size which is a paper size selected by the user from among a plurality of paper sizes at the terminal device,
the controller is further configured to determine whether the obtained first paper size and the second paper size included in the received print executing command satisfies a predetermined condition, wherein
in a case where it is determined that the obtained first paper size and the second paper size included in the received print executing command satisfies the predetermined condition, the controller is configured to cause the display unit to display the inquiry screen, and in a case where it is determined that the first paper size and the second paper size do not satisfy the predetermined condition, the controller is configured not to cause the inquiry screen to be displayed.

3. The printer according to claim 2, wherein
the predetermined condition includes at least one of following conditions:
the second paper size is equal to the first paper size; and
the second paper size is half of the first paper size.

4. The printer according to claim 2, wherein
the controller further comprises a memory, and
the controller is further configured to cause, before the print executing command is received from the terminal device, the memory to store a setting value which indicates whether the inquiry screen is to be displayed,
wherein in a case where the setting value indicates that the inquiry screen is to be displayed, the controller is configured to cause the display unit to display the inquiry screen after the print executing command has been received from the terminal device, and
in a case where the setting value indicates that the inquiry screen is not to be displayed, the controller is configured not to cause the inquiry screen to be displayed even when the print executing command is received from the terminal device.

5. The printer according to claim 4, wherein
the controller is further configured to:
receive an access request for requiring access to a web server in the printer from an external device;
in a case where the access request is received from the external device, send, to the external device, setting screen data representing a setting screen for designating the setting value; and
in a case where the setting value is designated in the setting screen displayed at the external device, receive the setting value from the external device,
wherein in a case where the setting value is received from the external device, the controller is configured to cause the memory to store the setting value.

6. The printer according to claim 4, wherein
the controller is configured to cause, before the print executing command is received from the terminal device, the memory to store a setting value for each of a plurality of combinations, respectively, wherein each of the plurality of combinations is a combination of a paper size that is one of a plurality of paper sizes which may be contained in the container unit and a paper size that is one of a plurality of paper sizes which may be included in the print executing command, and
the predetermined condition includes that the setting value corresponding to a combination of the first paper size and the second paper size indicates that the inquiry screen is to be displayed.

7. The printer according to claim 6, wherein
the controller is configured to cause the memory to store, for each of a plurality of users, user information for identifying a user and a setting value corresponding to each of the plurality of combinations, respectively, in association with each other,
the controller is further configured to receive target user information for identifying a user of the terminal device from the terminal device, and
the predetermined condition includes the setting value corresponding to a specific combination of the first paper size and the second paper size, associated with the received target user information, indicating that the inquiry screen is to be displayed for the specific combination of first paper size and the second paper size.

8. The printer according to claim 1, wherein
the predetermined process related to cutting the sheet paper is any of a process to cut the sheet paper, a process to perforate the sheet paper, and a process to crease the sheet paper.

9. The printer according to claim 8, wherein
the predetermined process related to cutting the sheet paper is any of a process to cut the sheet paper in half, a process to perforate at a half position of the sheet paper, and a process to crease at the half position of the sheet paper.

10. The printer according to claim 9, wherein
the predetermined process related to cutting the sheet paper is a process to cut the sheet paper having an A4 size into an A5 size.

11. The printer according to claim 1, wherein
the terminal device comprises a general-purpose printer driver, and
the controller is configured to receive the print executing command from the general-purpose printer driver of the terminal device.

12. The printer according to claim 1, wherein
the process executing unit is located downstream of the print executing unit in a transportation direction of the sheet paper.

13. A non-transitory computer-readable recording medium storing computer-readable instructions for a printer which comprises:
   a container unit configured to contain a sheet paper;
   a transportation unit configured to transport the sheet paper from the container unit;
   a print executing unit configured to execute printing on the sheet paper;
   a process executing unit configured to execute a predetermined process related to cutting the sheet paper; and
   a processor, wherein
the computer-readable instructions, when executed by the processor, cause the printer to:
   in a case where a print operation for causing the printer to execute printing an image is performed on a terminal device, receive a print executing command from the terminal device;
   after the print executing command has been received from the terminal device, cause the transportation unit to transport the sheet paper and cause the print executing unit to print the image on the sheet paper;
   after the print executing command has been received from the terminal device, cause a display unit to display an inquiry screen, the inquiry screen being for inquiring a user whether the predetermined process related to cutting the sheet paper is to be executed on the sheet paper; and
   in a case where it is selected by the user in the inquiry screen that the predetermined process related to cutting the sheet paper is to be executed on the sheet paper, cause the process executing unit to execute the predetermined process related to cutting the sheet paper on the sheet paper, wherein in a case where it is selected by the user in the inquiry screen that the predetermined process related to cutting the sheet paper is not to be executed on the sheet paper, the predetermined process related to cutting the sheet paper is not executed on the sheet paper.

14. The printer according to claim 1, wherein the controller causes the inquiry screen to be displayed on the display unit after each time the print executing command is received.

15. The non-transitory computer-readable recording medium according to claim 13, wherein the computer-readable instructions, when executed by the processor, cause the printer to display the inquiry screen on the display unit after each time the print executing command is received.

* * * * *